(12) United States Patent
Koma

(10) Patent No.: US 6,188,456 B1
(45) Date of Patent: Feb. 13, 2001

(54) LIQUID CRYSTAL DISPLAY AND PROJECTOR USING THE SAME

(75) Inventor: Norio Koma, Motosu-gun (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/193,747

(22) Filed: Nov. 17, 1998

(30) Foreign Application Priority Data

Nov. 18, 1997 (JP) .................................................. 9-317518

(51) Int. Cl.[7] .................................................. G02F 1/1335
(52) U.S. Cl. .......................... 349/113; 349/130; 349/131
(58) Field of Search ................................. 349/113, 130, 349/131

(56) References Cited

U.S. PATENT DOCUMENTS

| | | |
|---|---|---|
| 5,471,330 | 11/1995 | Sarma . |
| 5,514,879 | 5/1996 | Yamazaki . |
| 5,557,534 | 9/1996 | Wu . |
| 5,576,860 | * 11/1996 | Nakamura et al. .................. 349/130 |
| 5,600,155 | 2/1997 | Wu . |
| 5,905,548 | 5/1999 | Shimada . |

OTHER PUBLICATIONS

Bahadur, Liquid Crystals Applications And Uses, vol. 1, pp. 106–107 and 410–411.*

* cited by examiner

Primary Examiner—James A. Dudek
(74) Attorney, Agent, or Firm—Hogan & Hartson, LLP

(57) ABSTRACT

Light emitted from a light source is converted to predetermined linearly polarized light by a polarizing separation filter and a first polarizing plate and is irradiated on a liquid crystal display. The liquid crystal display uses a low-temperature poly silicon TFT, and has a wide viewing angle. The liquid crystal display utilizes aluminum for a pixel electrode which functions as a reflection layer The light reflected by the liquid crystal display is irradiated on a screen through a second polarizing plate and a projector lens.

2 Claims, 6 Drawing Sheets

LIQUID CRYSTAL DISPLAY AND PROJECTOR USING THE SAME

BACKGROUND OF THE INVENTION

1. Field of the Invention

The present invention relates to a liquid crystal display (LCD) for driving pixels by a thin film transistor (TFT) to perform liquid crystal display operation, and, more particularly, to a reflection type liquid crystal display utilizing poly silicon which is prepared using in a low-temperature process and to a projector employing this reflection type liquid crystal display.

2. Description of the Related Art

A liquid crystal display having a liquid crystal sealed between a pair of substrates for applying a voltage to the liquid crystal to perform desirable display operation has an advantage that it is small-sized, thin, and has reduced power consumption. For these reasons, liquid crystal displays are now used in a variety of OA and AV devices, portable or on-board information devices, and the like. It has also been proposed a transmission type liquid crystal display be used as a projector.

An active-matrix liquid crystal display using a thin film transistor (hereinafter referred to as a TFT) as a switching element for driving each liquid crystal pixel can selectively drive each TFT to select a particular liquid crystal pixel. Therefore, image display with no cross talk and with a higher resolution can be obtained.

Two known TFTs used in liquid crystal displays are amorphous silicon TFTs using amorphous silicon for an active layer and a poly silicon TFT using more highly mobile poly silicon for the active layer. The amorphous silicon TFT is most common in large-sized displays and the like because it can be formed over a large area through a low-temperature process. On the other hand, the poly silicon TFT has a higher mobility than the amorphous silicon and can form an element in a self-aligned manner. Therefore, the poly silicon TFT can more easily reduce TFT and pixel area than can the amorphous silicon TFT, so that a display having a higher resolution can more easily be manufactured. With the use of the poly silicon, the TFT can easily have a CMOS structure. For this reason, a driver TFT for driving a display section TFT can be formed on the same substrate at almost the same processes as the display section TFT.

As stated above, the poly silicon TFT has attractive characteristics and can include a driver on its substrate. The poly silicon is formed by polycrystallizing amorphous silicon in a high-temperature process. As the amorphous silicon is exposed to a high temperature during the process, an inexpensive glass substrate cannot be used for the substrate. For this reason, the poly silicon TFT faces a practical problem with respect to cost.

However, polycrystallization technology using an annealing treatment such as laser annealing, lamp annealing, or the like has been improved. Consequently, it has become possible to manufacture poly silicon in the low-temperature (below 600° C.) process. By forming a poly silicon TFT in a low-temperature process, an inexpensive glass substrate can be developed for use as a TFT substrate. Cost can be reduced and, furthermore, effective area can be increased. As a result, a poly silicon TFT (hereinafter referred to as a low-temperature poly silicon TFT) formed in a low-temperature process has practical uses.

Although low-temperature poly silicon TFTs have been put into practical use, a liquid crystal material and a panel structure which are optimum for exhibiting the characteristics of the low-temperature poly silicon TFT for a liquid crystal display at the maximum and for enhancing the characteristics have yet to be developed. Commonly, a material and a structure which had been used in a conventional amorphous silicon TFT liquid crystal display are employed without adaptation. Consequently, there is a problem that the characteristics of the poly silicon TFT cannot be exhibited fully.

As mentioned above, a liquid crystal display can be utilized in a projector. More specifically, light passing or reflected through the liquid crystal display is controlled by the liquid crystal display, and is projected onto a screen. Consequently, an image is displayed on that screen. With the use of a reflection type liquid crystal display, the size of the projector can be comparatively reduced. In an ordinary liquid crystal display, however, a viewing angle is small. Therefore, there has been a problem that it is difficult to obtain sufficient reflected light.

SUMMARY OF THE INVENTION

It is an object of the present invention to obtain a reflection type liquid crystal enabling the best use of the characteristics of a low-temperature poly silicon TFT, and a projector utilizing the reflection type liquid crystal display.

In order to attain the above-mentioned object, the present invention has the following features.

The present invention provides an active-matrix type liquid crystal display comprising a plurality of pixel electrodes in a matrix on a first substrate, a thin film transistor formed on the first substrate to be connected with the corresponding pixel electrodes, and a liquid crystal layer interposed between the pixel electrodes provided on the first substrate and a common electrode on a second substrate opposed to the first substrate, the liquid crystal layer being driven by each pixel electrode to perform display operation, wherein the thin film transistor uses a poly silicon layer for an active layer, an initial direction of each liquid crystal molecule of the liquid crystal layer interposed between the first and second substrates is controlled in a nearly vertical direction with respect to the pixel electrode, a liquid crystal molecule with a molecular structure having fluorine side chain is selected as a liquid crystal material to be used for the liquid crystal layer, and the pixel electrode is formed of a reflection material and is used as a reflection layer. Preferably, the poly silicon layer is formed at a low temperature.

The present invention allows the realization of a projector comprising a first polarizing plate for subjecting light emitted from a light source to predetermined polarization and transmitting the polarized light, a liquid crystal display for receiving and reflecting the light transmitted through the first polarizing plate in an oblique direction, and a second polarizing plate for transmitting the reflected light emitted from the liquid crystal display in a direction orthogonal to the first polarizing plate, the light transmitted through the second polarizing plate being projected onto a screen, wherein the liquid crystal display to be used has the above-mentioned structure.

Furthermore, the present invention provides a projector comprising a polarization beam splitter for receiving light incident from a light source in a direction that forms an angle of approximately 45° with the surface, and for transmitting light polarized in a predetermined direction, and reflecting light polarized in a direction orthogonal to the predetermined direction, a mirror for reflecting the polarized light transmitted through the polarization beam splitter and for causing the reflected light to be incident on the polarization beam splitter again, and a liquid crystal display for reflecting the light reflected by the polarization beam splitter and for causing the reflected light to be incident on the polarization beam splitter again, the light reflected by the liquid crystal display and transmitted through the polarization beam splitter being projected onto a screen, wherein the liquid crystal display to be used has the above-mentioned structure.

As a liquid crystal material to be used for the liquid crystal layer, preferably, at least one kind of liquid crystal molecule in Formulas (1) to (6) including a molecular structure having fluorine on a side chain is selected from materials having the molecular structures indicated by the Formulas (1) to (6).

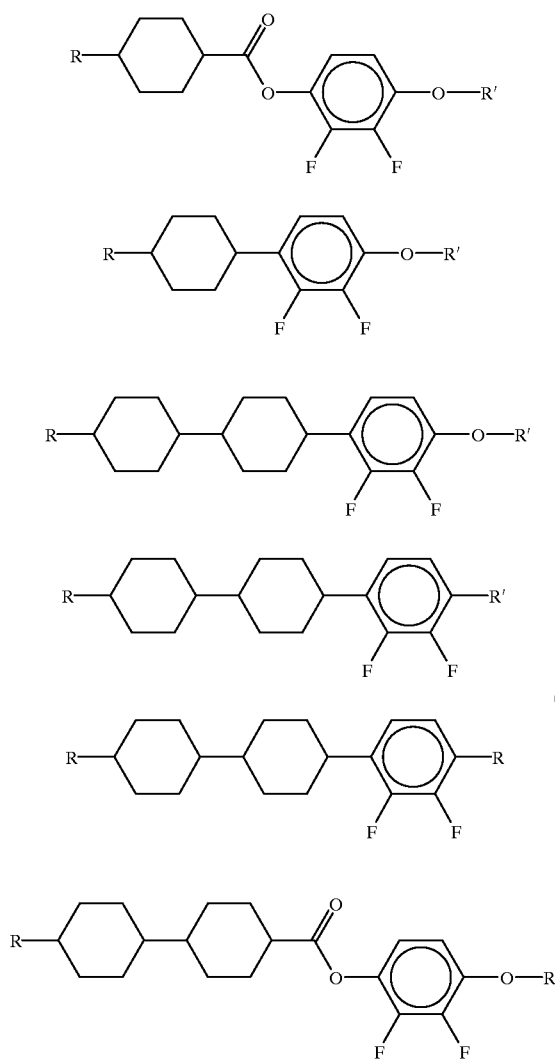

It may be preferable that an electrode-free portion for controlling the alignment of the liquid crystal be provided as an alignment control window in a predetermined region of the common electrode provided on the second substrate which is opposed to the pixel electrode, and that a plurality of vertical alignment regions having different tilt azimuths be formed in each pixel electrode region while changing the alignment of the liquid crystal molecule into a tilted vertical alignment.

It may also be preferable that the first substrate have a flattened interlayer insulator film formed thereon to cover the thin film transistor which is provided on the first substrate, and that the pixel electrodes formed on the flattened interlayer insulator film cover at least a region where the thin film transistor is to be formed.

It also may be preferable that a liquid crystal material to be used for the liquid crystal layer have a negative dielectric anisotropy, and that the vertical alignment of the liquid crystal layer be controlled without a rubbing step using a vertical alignment film formed to cover the common electrode and the pixel electrodes, the alignment control window provided on the common electrode, and a voltage applied to respective pixel electrodes.

According to the present invention, thus, the liquid crystal display can have a great viewing angle and, when the liquid crystal display is used as a reflection type liquid crystal display for a projector, sufficient light can be reflected.

DESCRIPTION OF THE PREFERRED EMBODIMENT

The preferred embodiment of the present invention will be described below with reference to the appended drawings.

Figure 1:
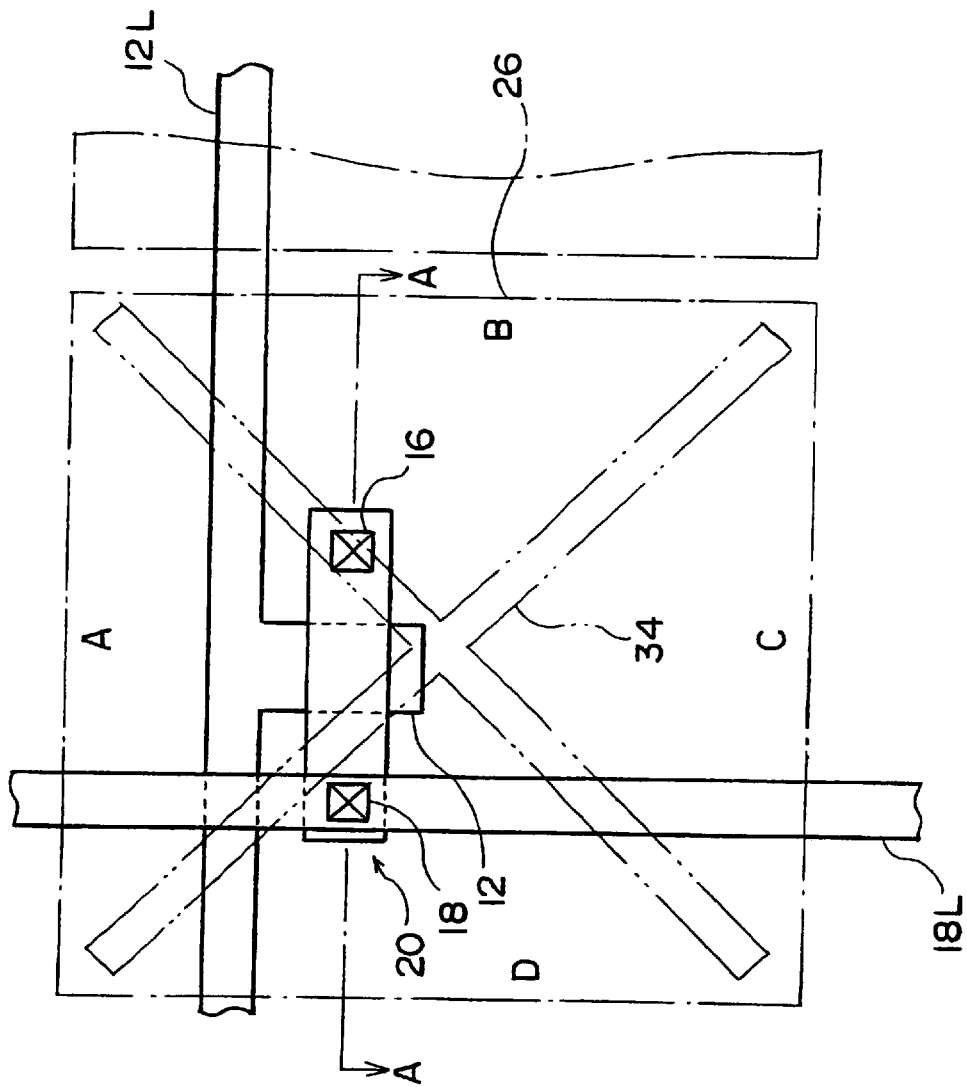
FIG. 1 is a conceptual view showing an example of a planar structure of an active-matrix type liquid crystal display according to the present invention.
Figure 2:
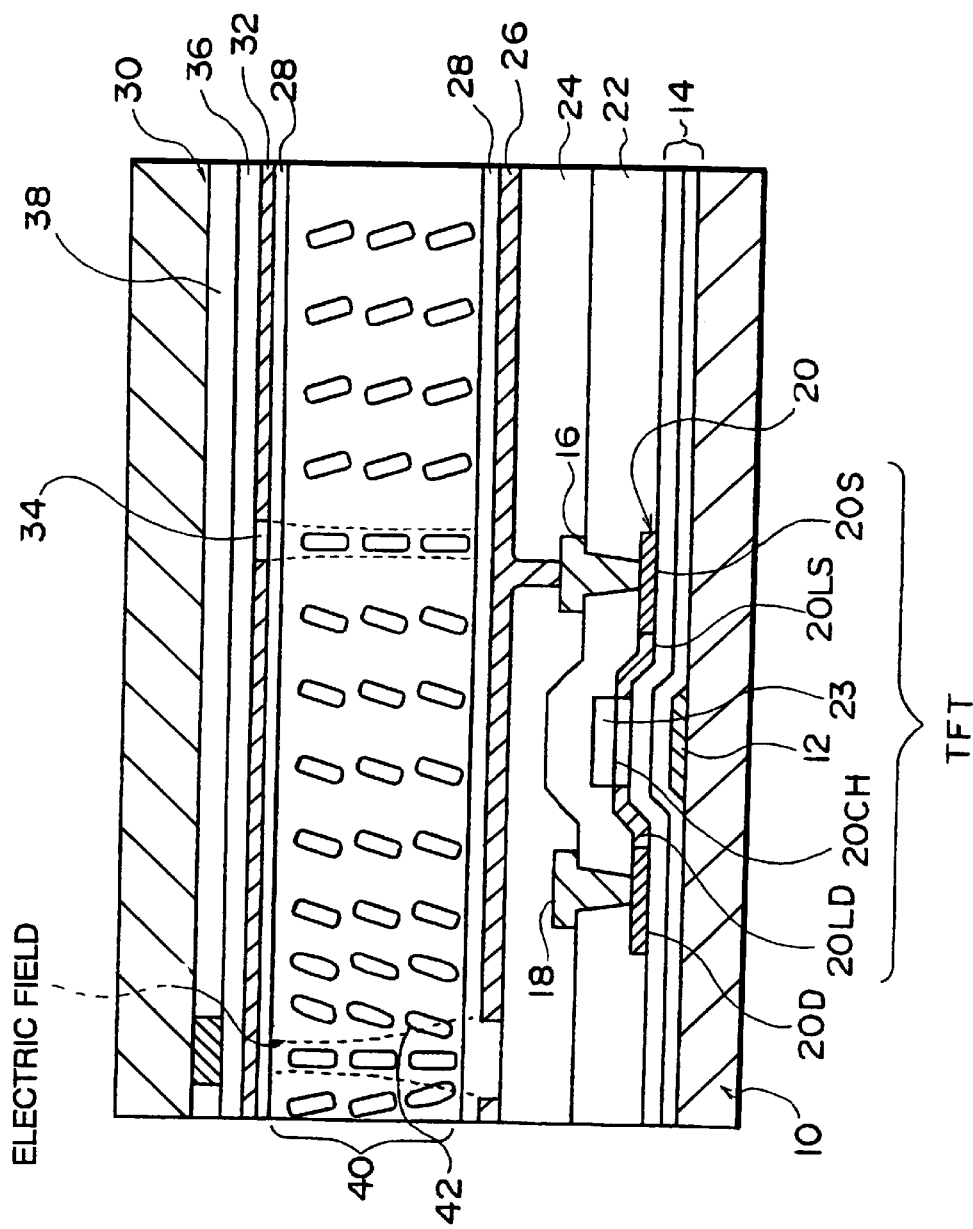
FIG. 2 is a view showing a schematic section taken along the line A—A in the liquid crystal display in FIG. 1.

FIG. 1 shows an example of a planar structure for one pixel of an active-matrix type liquid crystal display used as a reflection type display according to the embodiment of the present invention, and FIG. 2 shows an example of a schematic section taken along the line A—A in FIG. 1. The active-matrix type liquid crystal display according to the present embodiment comprises a TFT substrate (a first substrate) 10 having a low-temperature poly silicon TFT formed thereon, and an opposed substrate (a second substrate) 30 which is opposed to the TFT substrate 10, with a liquid crystal layer 40 interposed therebetween.

In an example shown in FIG. 2, a gate electrode 12 obtained by patterning metals such as Cr, Ta, Mo, or the like and a gate electrode wiring 12L integrated with the gate electrode 12 are provided on the TFT substrate 10 made of glass or other suitable material. A gate insulation film 14 having a lamination structure of, for example, SiNx, $SiO_2$, or their combination is formed to cover the gate electrode 12 and the gate electrode wiring 12L. A poly silicon thin film 20 functioning as an active layer of the TFT is formed on the gate insulation film 14. The poly silicon thin film 20 is formed as follows. First, an amorphous silicon thin film is polycrystallized by low-temperature annealing treatment using laser annealing, lamp annealing, or their combination, and is then subjected to patterning like an island. The poly silicon thin film 20 is obtained as a result.

A doping stopper 23 comprising $Sio_2$ or the like is formed on the poly silicon thin film 20. The doping stopper 23 is formed by exposing the back side of the TFT substrate 10 (the underside in FIG. 2) to light using the gate electrode 12 as a mask, thereby performing patterning to create almost the same shape as the gate electrode 12 in self-alignment. By utilizing the doping stopper 23, the poly silicon thin film 20 is doped with impurities such as phosphorus, arsenic, or the like in low concentrations. Consequently, a low concentration source region 20LS and a low concentration drain region 20LD which contain the impurities having low concentrations are formed in self-alignment on both sides of the poly silicon thin film 20 in a region provided under the doping stopper 23. The doping stopper 23 serves as a mask so that the region provided under the doping stopper 23 is not doped with the impurities. Consequently, the region provided under doping stopper 23 becomes an intrinsic region which does not substantially contain impurities. The intrinsic region functions as a channel region 20CH of the TFT. A source region 20S and a drain region 20D are formed by doping the outsides of the low concentration source region 20LS and the low concentration drain region 20LD with the same impurities in higher concentrations.

An interlayer insulator film 22 comprising SiNx or the like is formed on the poly silicon thin film 20 having each region (20CH, 20LS, 20LD, 20S, 20D) formed thereon and the doping stopper 23 to cover them. A source electrode 16 a drain electrode 18, and a drain electrode wiring 18L integrated with the drain electrode 18, formed of Al, Mo or the like, are formed on the interlayer insulator film 22. The source electrode 16 and the drain electrode 18 are connected to the source region 20S and the drain region 20D which are formed on the poly silicon thin film 20 via contact holes provided on the interlayer insulator film 22.

The low-temperature poly silicon TFT according to the present. embodiment comprises the gate electrode 12, the gate insulation film 14, the poly silicon thin film 20 (20CH, 20LS, 20LD, 20S, 20D), the source electrode 16, and the drain electrode 18; and has, as an active layer, the poly silicon thin film 20 formed through a low-temperature process. The poly silicon TFT consists of a bottom gate type TFT in which the gate electrode 12 is positioned on the underside of an element. TFT shape is not restricted to the bottom gate type, but may also be of a top gate type in which the gate electrode is provided on an upper layer above the poly silicon thin film.

In order to cover the TFTs and interlayer insulator film 22 having such structures, a flattened interlayer insulator film 24 is further formed in a thickness of about 1 $\mu$m or more over nearly the entire surface of the TFT substrate 10. For example, SOG (Spin On Glass), BPSG (Boro-Phospho-Silicate Glass), acrylic resin or the like may be used for the flattened interlayer insulator film 24. A pixel electrode 26 for liquid crystal driving which uses a conductive film having a reflecting function such as Al (aluminum) is provided on the flattened interlayer insulator film 24 to cover a region where the TFTs are formed. The pixel electrode 26 is; connected to the source electrode 16 through a contact hole provided on the flattened interlayer insulator film 24. In order to cover the pixel electrode 26, a vertical alignment film 28 made of polyimide (SiNx) or the like, for example, is formed as an alignment film for aligning liquid crystal molecules in a vertical direction without a rubbing step over almost the whole surface of the TFT substrate 10.

The opposed substrate (second substrate) 30, opposed to the TFT substrate 10 having the above-mentioned elements formed thereon with the liquid crystal layer 40 interposed therebetween, is formed of glass or the like in the same manner as the TFT substrate 10. An RGB color filter 38 is formed on a surface on the opposite side to the TFT substrate 10. A common electrode 32 comprising ITO or the like for driving a liquid crystal together with the opposed pixel electrode 26 is formed on the RGB color filter 38 through a protective film 36 such as acrylic resin. In the present invention, an X-shaped electrode-free portion, as shown in FIG. 1, for example, is formed as an alignment control window 34 on the common electrode 32 in an opposite region to each pixel electrode 26, which will be described below. The same vertical alignment film 28 as on the TFT substrate 10 side is formed on the common electrode 32 and the alignment control window 34 to cover them.

The liquid crystal layer 40 is sealed in a gap between the substrates set to about 3,um, for example. A liquid crystal material to be used has a negative dielectric constant anisotropy in which a dielectric constant in the direction of the minor axis of the liquid crystal molecule 42 is greater than that in the direction of the major axis thereof. The liquid crystal material used for the liquid crystal layer 40 in the present embodiment is fabricated by mixing, at a desired rate, liquid crystal molecules having structures indicated by the following Formulas (1) to (6). Mixing is performed to contain at least one kind of liquid crystal molecule in the Formulas (1) to (6) having a fluorine side chain.

As the liquid crystal material having a negative dielectric anisotropy, currently, a liquid crystal molecule having a cyano (CN -)group on a side chain is most commonly used for a TFT liquid crystal display using amorphous silicon having a low mobility for an active layer. However, the liquid crystal molecule having a cyano group side chain holds a residual DC voltage during low-voltage driving. Therefore, the liquid crystal molecule needs to be driven at a sufficiently high voltage and has a low voltage holding rate. In addition, a liquid crystal might stick to the substrate. In the present embodiment, however, a poly silicon TFT which is fabricated as a TFT in a low-temperature process and can be driven at a low voltage is employed. Accordingly, when the liquid crystal material having a cyano group on a side chain which has currently been used is utilized, it is impossible to make the most of the characteristics of the poly silicon TFT that low-voltage driving can be performed. A liquid crystal molecule having a fluorine side chain as shown in the Formulas (1) to (6) is used for a liquid crystal material. Consequently, the liquid crystal layer 40 can be driven at a long voltage of about 2 V, for example. Furthermore, even if low-voltage driving is performed by the poly silicon TFT, a sufficiently high voltage holding rate can be obtained and sticking can be prevented. Moreover, the liquid crystal display can be driven at a low voltage. Therefore, it is possible to obtain a device having lower power consumption than in the liquid crystal display using the amorphous silicon TFT.

In the present configuration, the above-mentioned liquid crystal material having negative dielectric anisotropy and containing a fluorine based liquid crystal molecule is used, and the vertical alignment film 28 is utilized to perform DAP (deformation of vertically aligned phase) alignment control in which the initial direction of the liquid crystal molecule is controlled in a vertical direction. DAP is one electrically controlled birefringence (ECB) method in which a difference in a refractive index between a major axis of a liquid crystal molecule and a minor axis thereof, that is, a birefringence phenomenon, is utilized to control transmittance of light incident on a liquid crystal layer.

When a voltage is applied to the liquid crystal layer 40, the DAP type liquid crystal display emits linearly polarized light incident on the liquid crystal layer 40 by birefringence as elliptically polarized light. When no voltage is applied to the liquid crystal layer 40, liquid crystal molecules are vertically aligned by the vertical alignment film 28. Therefore, the linearly polarized light incident on the liquid crystal layer 40 is not subjected to birefringence, but is directly emitted. Accordingly, the linearly polarized light is generated to be incident on the liquid crystal layer 40 by means of a first polarizing plate in a predetermined direction, and fetches reflected light through a second polarizing plate in a direction orthogonal to the first polarizing plate. Consequently, only the elliptically polarized light generated by the birefringence is transmitted through the second polarizing plate.

More specifically, in a DAP type liquid crystal display, a birefringence amount, that is, a phase difference (retardation amount) between an ordinary ray component of the incident linearly polarized light and an extraordinary ray component thereof is determined according to an electric field strength in the liquid crystal layer 40, and the display is changed from black to white according to a rise in a voltage applied to the liquid crystal layer 40. By controlling the voltage applied to the liquid crystal layer 40 for each pixel, the amount of light emitted from the second polarizing plate, that is, transmittance, can be controlled for each pixel. Accordingly, the emitted light is projected onto a screen so that a desired image is displayed.

In the present invention, furthermore, because the alignment control window 34 is provided as an electrode-free portion on the common electrode 32 as shown in FIGS. 1 and 2, the liquid crystal molecules are tilted in a predetermined azimuth to enhance response. In addition, the alignment direction is divided in the pixel to relieve viewing angle dependency of liquid crystal display. Thus, a display having a wide viewing angle can be realized. When the voltage is applied to the liquid crystal layer 40, an oblique electric field is generated in different azimuths between an edge portion on each side of the pixel electrode 26 shown in FIG. 1 and the common electrode 32 as shown by a dotted line in FIG. 2. Therefore, the liquid crystal molecule is tilted in an opposite direction to the oblique electric field in a vertical alignment state in the edge portion on the side of the pixel electrode 26. The liquid crystal molecules 42 have continuum properties. For this reason, when a tilt azimuth of the liquid crystal molecule is determined by the oblique electric field in the edge portion of the pixel electrode 26 (tilt angle is determined according to electric field strength), an azimuth at which the liquid crystal molecules 42 in the vicinity of the center of the pixel electrode 26 conforms to an azimuth at which the liquid crystal molecules 42 on each side of the pixel electrode 26. As a result, a plurality of regions of liquid crystal molecule having different tilt azimuths are generated in a single pixel region.

On the other hand, only a voltage equal to or less than the liquid crystal operating threshold is applied to the alignment control window 34. For this reason, the liquid crystal molecules positioned on the alignment control window 34 are kept aligned vertically as shown in FIG. 2. Therefore, the alignment control window 34 always acts as a boundary of regions having various tilt azimuths of the liquid crystal molecules. For example, if the alignment control window 34 is X-shaped as shown in FIG. 1, boundaries of regions A, B, C, and D having various tilt azimuths are fixed onto the X-shaped alignment control window 34.

In the DAP liquid crystal display described above, transmittance is varies according to the tilt of the liquid crystal molecule with respect to the incident light. Therefore, if the tilt azimuth of the liquid crystal molecule in one pixel region is one direction, a preferential viewing angle direction is also restricted to one corresponding direction so that viewing angle dependency is increased. When regions having a plurality of different tilt azimuths are present in one pixel region, roughness is generated on display so that quality of the display is deteriorated if a boundary of the regions having the azimuths is changed for each selection period. On the other hand, in the present embodiment, the alignment control window 34 can be used as a boundary, thereby performing alignment division in one pixel region to determine a region to be tilted at a plurality of different azimuths and providing a plurality of preferential viewing angle directions (four angles; top, bottom, right, and left in the present description). Thus, the viewing angle of the liquid crystal display can be widened.

In the present configuration, furthermore, the pixel electrode 26 is formed to cover regions where the TFTs and the electrode wiring (a gate electrode wiring, a drain electrode wiring) and the like are to be formed through the interlayer insulator films 22 and 24 as described above. Therefore, electric fields generated by the TFT and the electrode wiring leak into the liquid crystal layer 40. Consequently, effects on the alignment of the liquid crystal molecules can be prevented. Furthermore, the flatness of the surface of the pixel electrode 26 can be enhanced by the flattened interlayer insulator film 24, thereby preventing the alignment of the liquid crystal molecules from being disturbed by the unevenness of the surface of the pixel electrode 26. Thus, the leakage of the electric fields generated by the TFT and the electrode wiring, the unevenness of the surface of the pixel electrode 26, and the likes can be reduced. In the present embodiment, consequently, the alignment of the liquid crystal molecules can be controlled by all electrolytic field in an edge of the pixel electrode 26 and the alignment control window 34. Thus, a rubbing step for the vertical alignment film is not required.

In the above description, the poly silicon TFT capable of forming a channel, a source, and a drain in self-alignment is used as a switching element of a display section. Drivers each comprising the poly silicon TFTs having a CMOS structure fabricated at almost the same processes as that of the TFT of a liquid crystal display section are provided on the periphery of the liquid crystal display section. For this reason, yield of the liquid crystal display can be enhanced by omitting the rubbing step which might affect the poly silicon TFTs of a driver section having the TFTs densely formed as in the present embodiment.

The pixel electrode 26 is formed to cover the TFT and each electrode wiring. Consequently, an aperture ratio can be increased remarkably without restriction by the TFTS, the wiring and the like in the reflection type liquid crystal display.

Furthermore, the pixel electrode 26 is provided as an upper layer above the TFTs and each electrode wiring. Consequently, a distance between the pixel electrode 26 and the liquid crystal layer 40 is reduced. Therefore, a driving voltage can efficiently be applied to the liquid crystal layer 40 by the pixel electrode 26.

[Structure of Projector]

Figure 3:
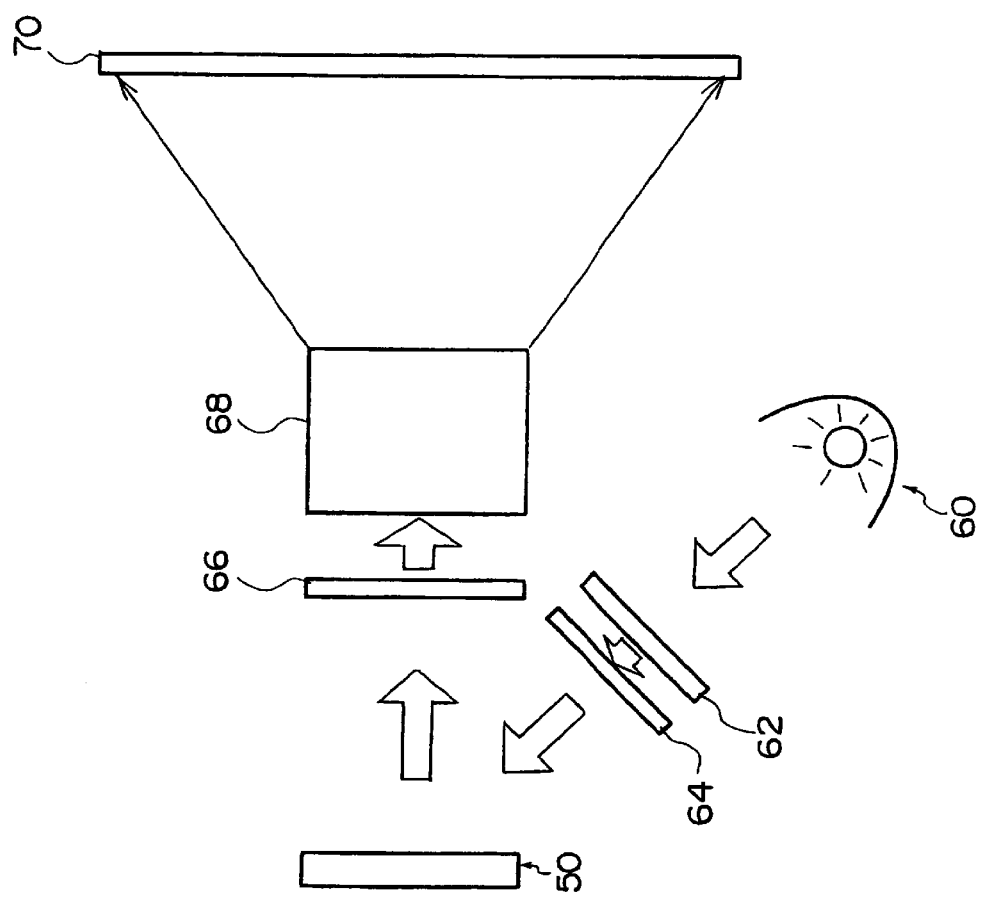
FIG. 3 is a view showing an example structure for a projector according to the present invention.

FIG. 3 shows an example structure by which a vertical alignment reflection type liquid crystal display using the above-mentioned poly silicon TFT can be applied to a projector light valve. Light emitted from a light source 60 is incident on a polarizing separation filter 62. In the polarizing separation filter 62, light polarized in a predetermined direction is separated. The separated light is incident on a first polarizing plate 64. only predetermined linearly polarized light passes through the first polarizing plate 64, and this light is incident on the above-mentioned reflection type liquid crystal display 50. The light emitted from the light source 60 can also be directly incident on the first polarizing plate 64. The polarizing separation filter 62 returns light polarized in the other direction to the direction of the light source 60. This light is not emitted to the first polarizing plate 64, but is separated. Therefore, the light can be reused as a light source. Consequently, a light utilization factor can be increased.

The reflection type liquid crystal display 50 reflects the linearly polarized light passing through the first polarizing plate 64 in a reflection pixel electrode, and emits the reflected light. The light emitted from the reflection type liquid crystal display 50 is magnified and projected onto a screen 70 through a second polarizing plate 66 and a projector lens 68. Consequently, voltage application to the liquid crystal layer is controlled for each pixel of the reflection type liquid crystal display 50 so that the amount of light emitted from the liquid crystal display 50 and passing through the second polarizing plate 66 can be controlled for each pixel so that a desired image can be projected onto the screen 70.

RGB of reflected light is determined for each pixel by a color filter 38. Accordingly, each pixel is any of RGB, and the combined pixels provide full color display.

In the present embodiment, a liquid crystal display having a wide viewing angle in which an alignment azimuth is divided in ones pixel region by the alignment control window 34 as described above is utilized as the reflection type liquid crystal display 50. Accordingly, even if an angle of incidence on the liquid crystal display 50 is set in an oblique direction as shown in FIG. 3, fully reflected light can be obtained. Consequently, a bright image can be obtained on the screen 70. For this reason, degrees of freedom of a layout of the liquid crystal display 50 and other optical systems can be increased. Thus, the size of the complete TF can be reduced by altering the component layout.

The liquid crystal display 50 has a structure in which the pixeil electrode 26 covers the TFT. In the reflection type liquid crystal display, therefore, an aperture ratio can be set to a very larce value without restricting the TFT or altering the electrode wiring from the transmission liquid crystal display. Thus, a bright image can be projected by the screen 70. In the reflection type liquiLd crystal display, furthermore, the light source 60 can be provided relatively close to the projector lens 68. Consequently, the thickness of the whole projector can be reduced. Accordingly, in a front projection type liquid crystal display, that is, a system having the screen 70 formed as a large-sized separate member, the size of the projector itself can be comparatively reduced. Also in a system in which an image is projected from the rear face of the screen, that is, a so-called rear projection type, the size of the whole device can be reduced.

Figure 4:
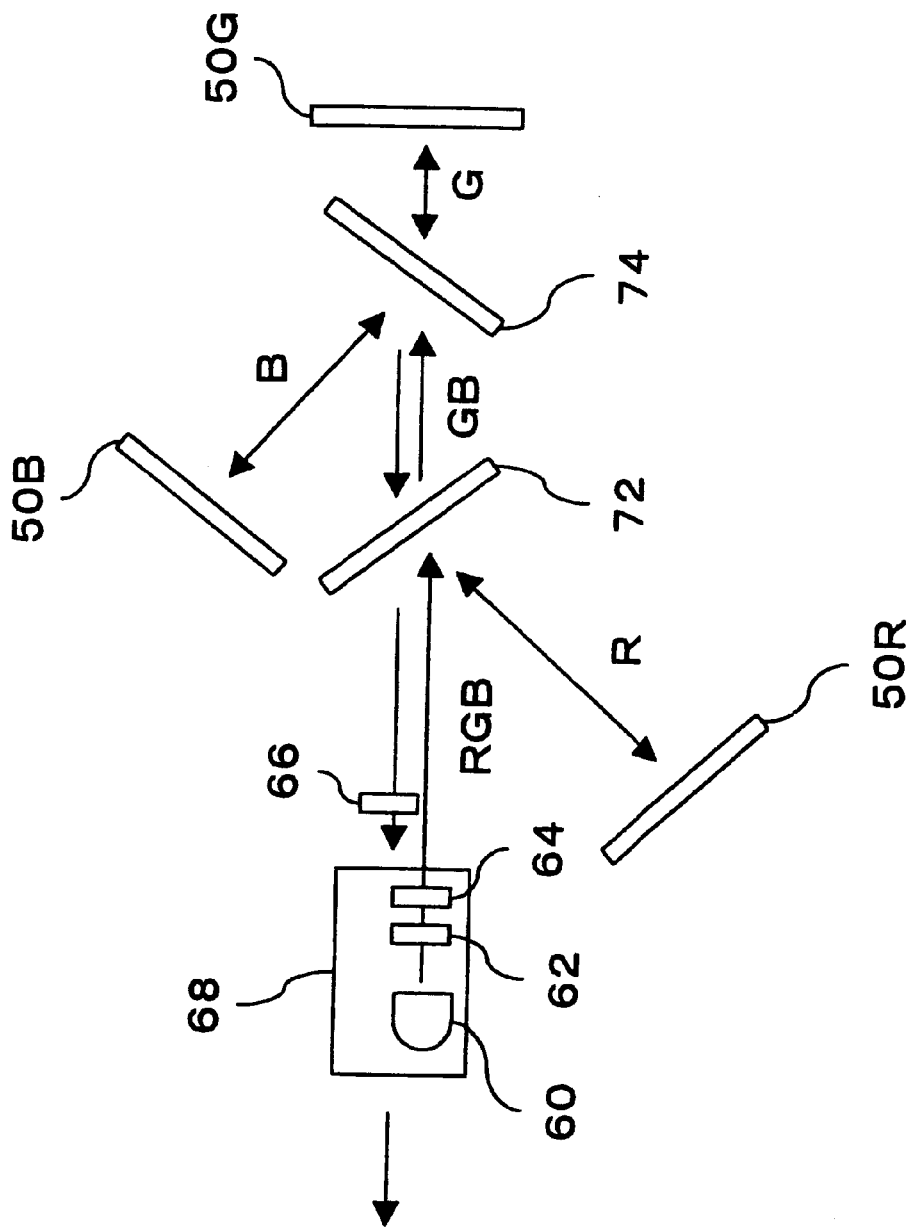
FIG. 4 is a view showing a structure obtained when the projector of FIG. 3 is applied to a color display.

FIG. 4 shows an example of a structure for a projector for providing color display. In this case, light incident on liquid crystal displays 50R, 50B, and 50G is restricted to predetermined colors and the color filter 38 becomes unnecessary. The light emitted from the light source 60 is channeled as predetermined linearly polarized light on a first dichroic mirror 72 by the polarizing separation filter 62 and the first polarizing plate 64. The first dichroic mirror 72 reflects only an R (red) component and transmits light of G (green) and B (blue). The reflected light having an R component is irradiated on a liquid crystal display 50R for the R component, and is subjected to predetermined modulation for reflection. The reflected light having the R component of the liquid crystal display 50R is again incident on the first dichroic mirror 72, and is reflected in a direction of the projector lens 68 which is shifted in a vertical direction on a paper with respect to the light source 60 and the like.

The G and B components transmitted through the first dichroic mirror 72 are incident on a second dichroic mirror 74, and the B component is reflected. The G component is directly transmitted through the second dichroic mirror 74. The reflected B component is irradiated on the liquid crystal display 50B for the B component and is subjected to predetermined modulation. The reflected light thus obtained is returned to the second dichroic mirror 74. The reflected light emitted from the liquid crystal display 50B is reflected in the second dichroic mirror 74, and proceeds in a direction of the projector lens 68 through the first dichroic mirror 72.

The G component transmitted through the second dichroic mirror 74 is irradiated on the liquid crystal display 50G. The reflected light having the B component which is subjected to predetermined, modulation in the liquid crystal display 50G is returned to the direction of the second dichroic mirror 74, and proceeds in the direction of the projector lens 68 through the second dichroic mirror. 74 and the first dichroic mirror 72.

A second polarizing plate 66 is provided orthogonal to the first polarizing plate 64, just before the projector lens 68. Light for each of the RGB components which has image information subjected to the modulation by the liquid crystal displays 50R, 50B and 50G is controlled to have a predetermined transmittance and is then incident on the projector lens 68. Accordingly, the light emitted from the projector lens 68 is projected onto the screen so that a color image is projected on the screen. While the polarizing separation filter 62 and the first polarizing plate 64 have been provided ahead of the light source a 60 and the second polarizing plate 66 has been provided just before the projector lens 68 in the above description and the accompanying drawings, the polarizing separation filter 62 and the first polarizing plate 64 may be provided on an incident optical path reaching each of the liquid crystal displays 50R, 50B, and 50G, and the second polarizing plate 66 may be provided on each of reflective optical paths. Also, in this case, the incident optical path and the reflective optical path are shifted in a vertical direction.

Figure 5:
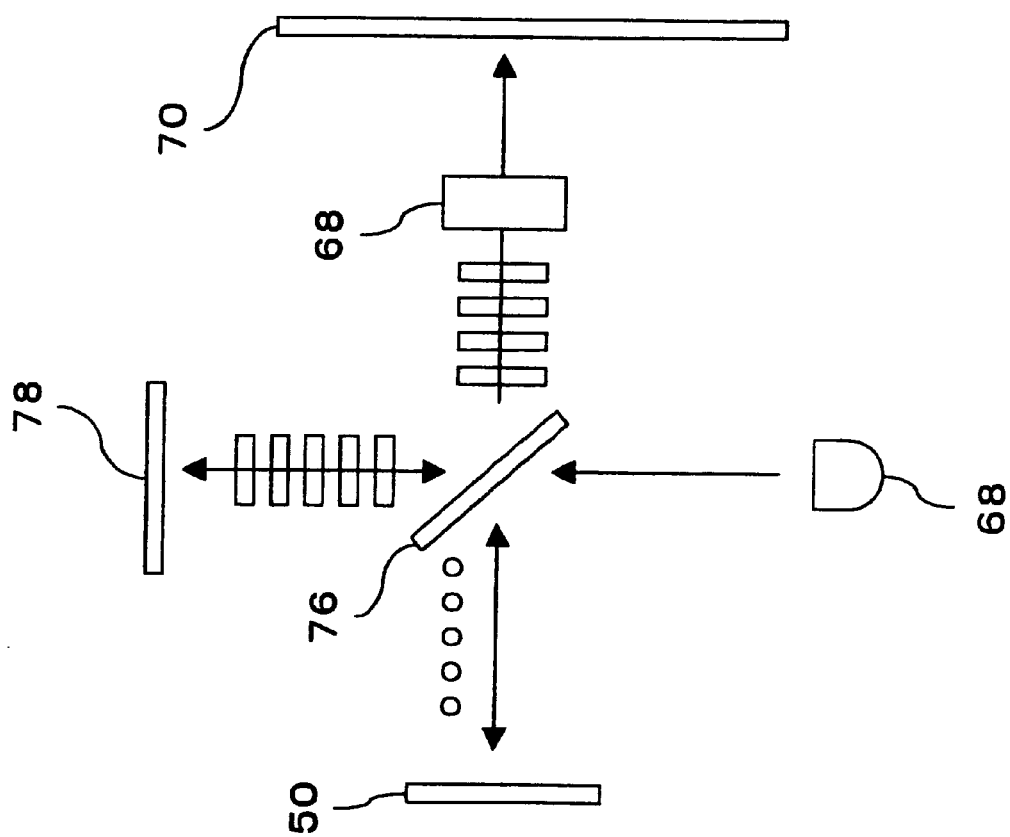
FIG. 5 is a view showing another example structure for the projector.

FIG. 5 shows a structure of a projector according to another embodiment of the present invention. In the projector, light emitted from a light source 60 is incident on a polarization beam splitter 76. The polarization beam splitter 76 reflects light polarized in a predetermined direction, and transmits light polarized in a direction orthogonal to the polarized light thus reflected. The polarization beam splitter 76 is inclined at an angle of 45° with respect to a traveling direction of the light emitted from the light source 60. The reflected light travels in a direction orthogonal to the incident direction and is then incident on a liquid crystal display 50. The liquid crystal display 50 has the same structure as described above. Elliptically polarized light which has been subjected to predetermined modulation depending on voltage application is obtained. Although the reflected light is again incident on the polarization beam splitter 76, light having a vibration plane changed in the orthogonal direction by the liquid crystal display 50 passes through the polarization beam splitter 76. The light reflected by a pixel portion to which the voltage of the liquid crystal display 50 is applied is controlled to have a predetermined transmittance, passes through the polarization beam splitter 76, and is projected onto a screen 70 through a projector lens 68. A mirror 78 serves to exactly return the transmitted light to the polarization beam splitter 76. The transmitted light is returned to the light source 60 through the polarization beam splitter 76. The light source 60 has a curved mirror for collection on the back thereof. Therefore, the returned light is utilized as light emitted from the light source again. Similarly, the reflected light emitted from the liquid crystal display 50 of which polarization plane is not rotated is also returned to the light source 60.

In a system shown in FIG. 5, furthermore, the liquid crystal display 50, the polarization beam splitter 76, the mirror 78 and the lens 68 are spatially arranged in a line for each RGB. Reflected light which has been modulated for each component is individually obtained. The light thus obtained is projected onto the screen 70 together. Consequently, color display can be achieved.

[Relationship between Δn·d and voltage–transmittance characteristic]

Next, the relationship between Δn·d and a voltage–transmittance characteristic of a liquid crystal display having a normally black mode in which a liquid crystal having a negative dielectric anisotropy is vertically aligned will be described below with reference to FIG. 6. When the liquid crystal display is of a reflection type, reflectance corresponds to transmittance. When the liquid crystal display is of a transmission type, transmittance corresponds to transmittance. In a transmission type liquid crystal display using ITO (Indium Tin Oxide) or the like as the pixel electrode 26 shown in FIG. 2, a voltage–transmittance characteristic is excellent with Δn·d of 0.35. More specifically, the transmittance (reflectance in FIG. 6) is increased from 0 (non-transmission) to about 0.47 in the vicinity of a voltage applied to the liquid crystal layer of 1 V to 2 V, and is kept almost stable within a voltage of 2 V to 6 V.

On the other hand, in the reflection type liquid crystal display in which light passes through the liquid crystal layer 40 twice by using the reflection pixel electrode 26, the voltage–transmittance characteristic is completely different from that of the transmission type liquid crystal display, that is, a sharp peak of the transmittance (reflectance) is generated in the vicinity of 1 V with Δn·d of 0.35. In the vicinity of a voltage of 3 V, the transmittance (reflectance) is set to 0 again. Even if a voltage of 3 V or more is applied, the transmittance (reflectance) is not so raised. Accordingly, even if low-voltage driving at about 2V can physically be performed by employing a low-temperature poly silicon TFT, it is difficult to control the alignment of the liquid crystal layer with high precision in the reflection type liquid crystal display. Consequently, the display is colored. When the reflection type liquid crystal display has Δn·d=0.43, a peak of the transmittance present in the vicinity of 1 V is further sharpened, making it more difficult to perform control at a low voltage. The transmittance (reflectance) is once set to 0 in the vicinity of 2 V, and is then raised again at 2 V or more.

Figure 6:
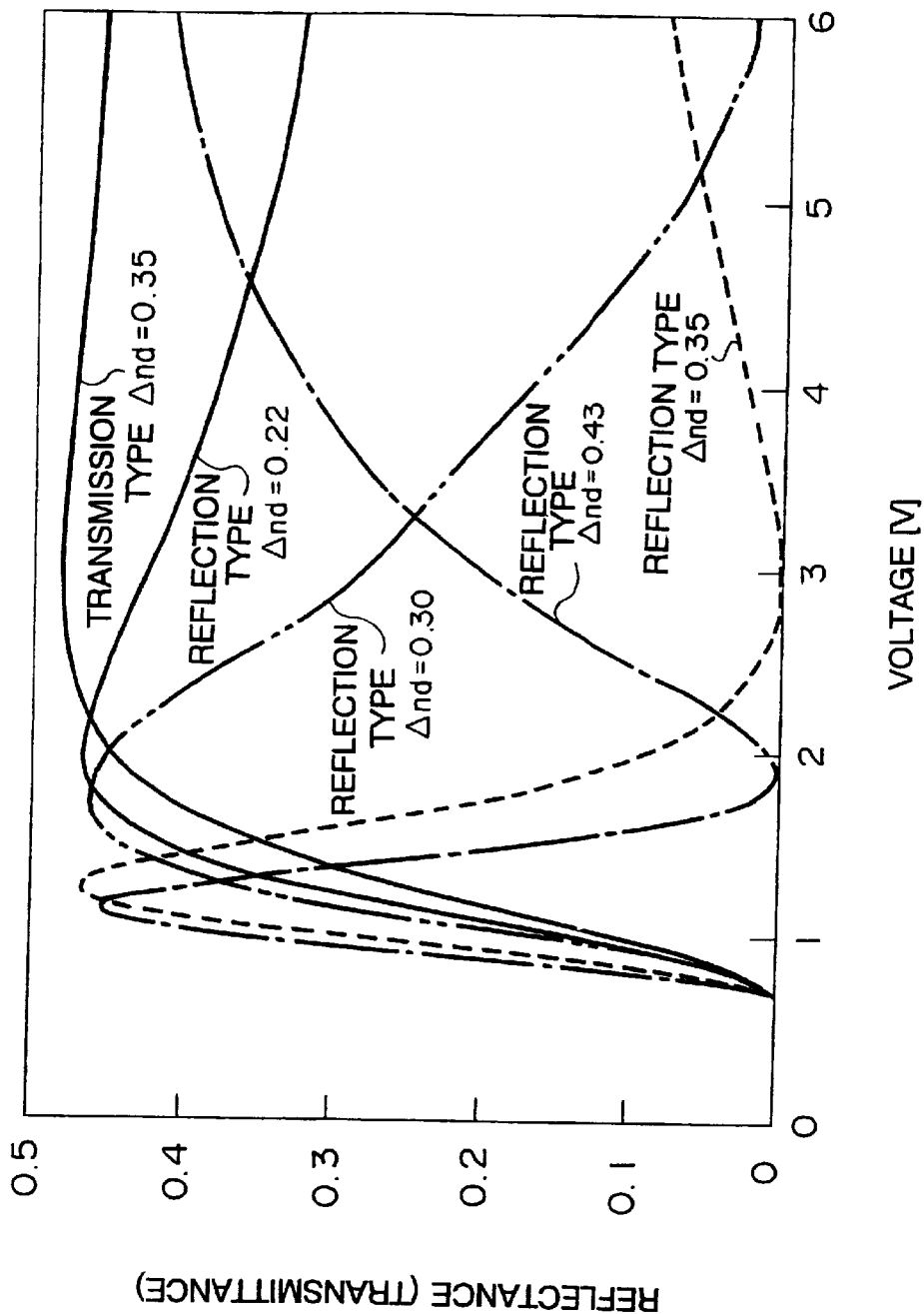
FIG. 6 is a chart showing voltage-reflectance characteristics in transmission and reflection type liquid crystal displays.

As shown in FIG. 6, however, the transmittance characteristic in a voltage region of 1 V to 2 V is moderate in the reflection type liquid crystal display with Δn·d≈0.30. The transmittance has a value greater than 0 at about 6 V. In the reflection type liquid crystal display with Δn·d=0.22, furthermore, the characteristic becomes more moderate between 1 V and 2 V. The transmittance raised to about 0.47 within these voltage ranges is reduced to about 0.35 with a voltage of 6 V. Stable control which is not inferior to that in the transmission type liquid crystal display having Δn·d=0.35 can be performed.

As described above, the reflection type liquid crystal display having a normally black mode using the poly silicon TFT can be controlled with certainty at a low voltage by setting (Δn·d) smaller than about 0.30, and preferably about 0.22.

In the present embodiment, the liquid crystal material containing liquid crystal molecules (Formulas (1) to (6)) having at least a fluorine side chain is used for the liquid crystal layer 40 as described above. The birefringence Δn can be set to about 0.07 or less. Accordingly, also when the thickness d of the liquid crystal layer has a value of, for example, about 5 μm, the above-mentioned liquid crystal material can be utilized to adjust a blending rate. Consequently, (Δn·d) can be set to 0.30 or less. If the thickness d of the liquid crystal layer is set to about 3 μm, a characteristic of Δn·d=0.22 shown in FIG. 6 can also be easily obtained.

In the present invention, furthermore, the flattened interlayer insulator film 24 is formed on the TFT and the electrode wiring, and the pixel electrode 26 is formed on the flattened interlayer insulator film 24. With such a structure, a thickness of the flattened interlayer insulator film 24 can be regulated without changing an efficiency of voltage application to the liquid crystal layer 40. Consequently, the thickness d of the liquid crystal layer 40 can simply be varied. Thus, (Δn·d) can be easily adjusted.

[Other structures]

In the liquid crystal display according to the present invention, a phase difference (Δn·d/λ) of extraordinary light (Δn: a change in a refractive index, d: an optical path length and λ: a wavelength) is varied depending on the wavelength λ. Accordingly, (Δn·d) of the liquid crystal layer in each of the liquid crystal displays 50R, 50B, and 50G is suitably regulated and set depending on the wavelength of the RGB. In addition to the (Δn·d), similarly, a voltage to be applied between a common electrode and a pixel electrode in each of the liquid crystal displays 50R, 50B and 50G is suitably changed depending on the RGB. In particular, when the RGB is to be determined for each pixel by the color filter 38, it is preferable that the applied voltage should be changed according to the pixel RGB.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A projector comprising:

a first polarizing plate for subjecting light emitted from a light source to predetermined polarization and then transmitting the polarized light;

a liquid crystal display for receiving and reflecting the light transmitted through the first polarizing plate in an oblique direction; and a second polarizing plate for transmitting the reflected light emitted from the liquid crystal display in a direction orthogonal to the first polarizing plate, the light transmitted through the second polarizing plate being projected onto a screen, the liquid crystal display including:

a plurality of pixel electrodes provided in a matrix on a first substrate;

a thin film transistor formed on the first substrate to be connected with the corresponding pixel electrodes; and a liquid crystal layer interposed between the pixel electrodes provided on the first substrate and a common electrode on a second substrate opposed to the first substrate, the liquid crystal layer being driven by each pixel electrode to perform display operation, wherein the thin film transistor utilizes a poly silicon layer for an active layer, an initial direction of each liquid crystal molecule of the liquid crystal layer interposed between the first and second substrates is controlled in a nearly vertical direction with respect to the pixel electrode, a liquid crystal molecule with a molecular structure having a fluorine side chain is selected as a liquid crystal material to be used for the liquid crystal layer, and the pixel electrode is formed of a reflection material and utilized as a reflection layer.

2. A projector comprising:

a polarization beam splitter for receiving light incident from a light source in a direction with an angle of about 45° to its surface, and for transmitting light polarized in a predetermined direction, and reflecting light polarized in a direction orthogonal to the predetermined direction;

a mirror for reflecting the polarized light transmitted through the polarization beam splitter and for causing the reflected light to again be incident on the polarization beam splitter; and a liquid crystal display for reflecting the light reflected by the polarization beam splitter and for causing the reflected light to again be incident on the polarization beam splitter, the light reflected by the liquid crystal display and transmitted through the polarization beam splitter being projected onto a screen, the liquid crystal display including:

a plurality of pixel electrodes provided in a matrix on a first substrate;

a thin film transistor formed on the first substrate to be connected with the corresponding pixel electrodes; and a liquid crystal layer interposed between the pixel electrodes provided on the first substrate and a common electrode on a second substrate opposed to the first substrate, the liquid crystal layer being driven by the pixel electrodes to perform display operation, wherein a thin film transistor uses a poly silicon layer for an active layer, an initial direction of each liquid crystal molecule of the liquid crystal layer interposed between the first and second substrates is controlled in a nearly vertical direction with respect to the pixel electrodes, a liquid crystal molecule with a molecular structure having fluorine side chain is selected as a liquid crystal material to be used for the liquid crystal layer, and the pixel electrode is formed of a reflection material and is used as a reflection layer.

* * * * *